(12) United States Patent
Cartal et al.

(10) Patent No.: US 8,182,191 B2
(45) Date of Patent: May 22, 2012

(54) DEVICE FOR UNLOADING TRAYS USING A PIVOT MEMBER

(75) Inventors: Bruno Cartal, Montelier (FR); Francois Madar, Bourg les Valence (FR); Matthew Good, Marriottsville, MD (US)

(73) Assignee: SOLYSTIC, Gentilly Cedex (FR)

( * ) Notice: Subject to any disclaimer, the term of this patent is extended or adjusted under 35 U.S.C. 154(b) by 383 days.

(21) Appl. No.: 12/447,749

(22) PCT Filed: Nov. 18, 2008

(86) PCT No.: PCT/FR2008/052070
§ 371 (c)(1),
(2), (4) Date: Apr. 29, 2009

(87) PCT Pub. No.: WO2009/071789
PCT Pub. Date: Jun. 11, 2009

(65) Prior Publication Data
US 2010/0316473 A1    Dec. 16, 2010

Related U.S. Application Data

(60) Provisional application No. 60/988,932, filed on Nov. 19, 2007.

(51) Int. Cl.
*B65B 21/02*    (2006.01)

(52) U.S. Cl. .......................... 414/404; 414/407; 414/425
(58) Field of Classification Search ................. 414/404, 414/407, 425, 810; 209/542, 617, 651
See application file for complete search history.

(56) References Cited

U.S. PATENT DOCUMENTS

| | | | | |
|---|---|---|---|---|
| 5,319,939 A | * | 6/1994 | McFadden et al. | 62/63 |
| 6,722,838 B2 | * | 4/2004 | Svyatsky et al. | 414/404 |
| 2002/0074268 A1 | * | 6/2002 | Hendrickson et al. | 209/542 |

* cited by examiner

*Primary Examiner* — Saul Rodriguez
*Assistant Examiner* — Willie Berry, Jr.
(74) *Attorney, Agent, or Firm* — Rothwell, Figg, Ernst & Manbeck, P.C.

(57) ABSTRACT

The device for unloading an open-top tray filled with flat articles placed in a stack on the bottom of the tray comprises a pivot member suitable for taking hold of the tray and for tilting its opening downwards. The device further comprises: a pusher for holding the flat articles at the bottom of the tray when the tray is tilted; a shuttle box moved by a conveyor between the pivot member and a box unloading zone remote from the pivot member, the shuttle box having a bottom with back and front walls that are retractable or removable relative to the bottom; a box tilting device for tilting the box into a tilted position immediately below the tray; and a moving paddle mounted to be moveable vertically and horizontally, and designed in such a manner as to retract the front wall of the box and as to be inserted between the back wall of the box and the stack of flat articles.

12 Claims, 5 Drawing Sheets

FIG_1

FIG_2

FIG_3

FIG_4

FIG_5

FIG_6

FIG_7

FIG_8

FIG_9

FIG_10

DEVICE FOR UNLOADING TRAYS USING A PIVOT MEMBER

CROSS-REFERENCE TO RELATED APPLICATIONS

This application is a 35 U.S.C. 371 National Phase Application from PCT/FR2008/052070, filed Nov. 18, 2008, and designating the United States, which claims the benefit of U.S. Provisional Application No. 60/988,932, filed Nov. 19, 2007.

BACKGROUND OF THE INVENTION

1. Field of the Invention

The invention relates to a device for unloading an open-top tray filled with flat articles, e.g. mailpieces, that are placed in a stack on the bottom of the tray, the device including a pivot member suitable for taking hold of the tray and for tilting its opening downwards.

2. Discussion of the Background Art

In general, during a mail sorting process, the mailpieces are transported in stacks inside trays by conveyors, and they are unloaded by an operator at a Tray Unloading Device (TUD). For example, the trays are brought from the sorting outlets of a sorting machine or from the outside towards the tray unloading device where the mailpieces are unloaded and then transferred to a feed magazine where the mailpieces are unstacked so as then to be transported towards other steps of the sorting process.

Document EP 1 829 804 discloses an unloading device for automatically unloading articles, e.g. mailpieces, contained in a tray conveyed by a conveyor. That unloading device comprises a clamping and pivoting device 50 that firstly holds the tray firmly between a lid 21 and a base 48, and that secondly causes the tray to pivot with the lid about a horizontal axis via articulated arms 22, 45, 47, so as to cause the mailpieces to slide out of the tray via an opening 53 formed in the lid 21 and so as to direct them onto a guide plate 23. However, while the tray is pivoting, the operator keeps a hand on the mailpieces so as to prevent them from slipping on one another and from falling into the tray too early, and then the operator must help the mailpieces to slide out of the pivoted tray.

Patent Document U.S. Pat. No. 7,195,236 also discloses a system for unloading articles contained in a tray and for conveying them on a conveyor 20 to a feed magazine. The mailpieces F are initially placed in a stack on edge in a tray 160 that has a retractable or removable front wall 160FR and that is transported by a conveyor 110 to an elevator 200 that lowers the mailpieces to the unloading system. That unloading system includes a device for raising the front wall 160FR of the tray and a paddle 30 that is mounted to move vertically and horizontally and that is designed to be inserted into the tray between the mailpieces and a back wall 160B of the tray, and then to push the mailpieces out of the tray, so that the mailpieces are transported directly on another conveyor 20 towards the feed unit. The paddle is comb-shaped and its teeth 30T are complementary to tines 160T on the back wall 160B of the tray so as to facilitate inserting the paddle between the mailpieces and the back wall of the tray. A plurality of paddles 30-1, 30-2, 30-3 disposed in front of the first paddle serve to straighten up the mailpieces on the conveyor. However, in that system, it is an operator who initially loads the mailpieces in a stack on edge into the tray.

The use of such unloading systems raises certain problems. For example, the trays must be transferred manually from the unloading point of the unloading system, and that is an arduous and tiring task for the operator in view of the weights of the trays and of the mailpieces, and of the distance to go along the conveyor for unloading each tray. In addition, the rate of throughput of the machine is slowed down because the operator cannot feed the feed magazine as quickly as would be necessary to keep up with the speed of the feed magazine.

Document US 2007/0201968 also discloses a system for unloading mailpieces at the end of sorting from a standard tray to a shuttle while putting them in a stack, and then for unloading the stack of mailpieces from the shuttle to a special tray for a feed magazine. The standard tray 9 is loaded manually or automatically onto an unloading device having a pivot frame 22 provided with a closure plate for closing and blocking the tray 9. The pivot frame pivots about a horizontal axis so as to cause the opening of the tray to face downwards, and a shuttle 8 is brought by a conveyor under the pivot frame, so as to receive the mailpieces 10 once the closure plate has been removed. The shuttles have V-shaped bottoms so as to jog and align the mailpieces. Then the shuttles are brought by a conveyor to a pivot device 52 so as to empty the mailpieces from the shuttle onto a surface 66 by means of a comb-shaped paddle 74 having its teeth complementary to ribs 86 on a wall of each of the shuttles. A plurality of pallets 73, 74 and 78, 79 serve to push the mailpieces towards the special tray 12 from which a removable or retractable wall is removed in order to enable the mailpieces to be loaded.

SUMMARY OF THE INVENTION

An object of the invention is to propose another device for automatically unloading a tray filled with flat articles, e.g. mailpieces, that is automated so as to help an operator, so as to reduce the workload of the operator, and so as to avoid manual unloading tasks that are arduous for the operator. In addition, another object of the invention is to propose a device for unloading a tray filled with flat articles that transfers the flat articles semi-automatically from a tray transfer system to a feed magazine with both reduced action from the operator and also a high rate of unloaded trays.

To these ends, the invention provides a device for unloading an open-top tray filled with flat articles placed in a stack on the bottom of the tray, the device comprising a pivot member suitable for taking hold of the tray and for tilting its opening downwards, said device being characterized in that it further comprises:

- a moving pusher suitable for holding the flat articles at the bottom of the tray when the tray is tilted by the pivot member;
- a shuttle box suitable for being moved by a conveyor in both directions along a conveying axis between the pivot member and a box unloading zone remote from the pivot member, the shuttle box having a bottom with opposite back and front side walls along the conveying axis, which walls are retractable or removable relative to the bottom;
- a box tilting device suitable for tilting the shuttle box into a tilted position immediately below the tray, and an opening device suitable for retracting the back wall of the tilted shuttle box and then for repositioning the back wall of the box on the box;
- a moving paddle mounted on an articulated arm, which paddle is firstly suitable for being moved vertically by pivoting of the articulated arm from a low position at the same level as the bottom of the box to a high position above the box, and secondly suitable for being moved horizontally by sliding along a rail, the paddle being designed in such a manner as to retract the front wall of the box and as to be inserted between the back wall of the box and the stack of flat articles.

With such an arrangement, parallel mail handling is performed with it being possible to achieve an unloading rate of 6 trays per minute.

The device of the invention for unloading flat articles can present the following features:

- the bottom and the back and front walls of the box are provided with grooves, and the paddle is in the form of a comb having teeth adapted to be inserted into the grooves of the box;
- the opposite left and right side walls of the shuttle box are equipped with a plurality of opposite notches designed to receive the back wall of the shuttle box so as to close the shuttle box in a plurality of different operational closure positions;
- the pusher is in the form of an L-shaped comb having teeth adapted to be inserted into the grooves of the front wall of the shuttle box;
- the device further comprises a crossing sensor for detecting the passing of a shuttle box between the pivot member and the box unloading zone, which sensor is suitable for holding the shuttle box in a stationary position in response to said crossing sensor detecting it going past; and
- a control button that, in response to being actuated, causes the conveyor to operate so as to move the shuttle box from said position to the box unloading zone and from the box unloading zone to the pivot member;
- the device further comprises a presence sensor for sensing the presence of a box in the box unloading zone, which sensor is suitable for stopping the conveyor if a shuttle box is present in the box unloading zone;
- the pivot member comprises a frame suitable for holding the tray firmly, a pusher actuator suitable for moving the pusher from a first position outside the tray to a second position inside the tray, in which second position the pusher retains the flat articles at the bottom of the tray, and a frame actuator suitable for causing the frame to pivot with the pusher and with the pusher actuator about a horizontal axis so as to tilt the opening of the tray downwards; and
- a second conveyor is provided in parallel with the first conveyor and a box diverter is provided for diverting the boxes from the first conveyor to the second conveyor.

The invention also provides a mailpiece handling system comprising a postal sorting machine having a feed magazine and sorting outlets equipped with removable trays for storing the mailpieces in them, a tray transfer system that is arranged to bring full trays from the sorting outlets of the machine to the feed magazine of the machine and to bring empty trays to the sorting outlets of the machine, which trays have been previously emptied into the feed magazine of the machine or come from outside the machine, and said mail handling system further comprising a tray unloading device of the invention, interposed between the tray transfer system and the magazine of the machine.

The invention also provides a method of unloading open-top trays filled with flat articles placed in a stack on the bottom of the tray, the method using a pivot member suitable for taking hold of the tray and for tilting its opening downwards, said method being characterized in that it comprises the steps consisting in:

automatically moving an empty shuttle box by means of a conveyor between the pivot member and an unloading zone remote from the pivot member, the shuttle box having a bottom with opposite back and front side walls that are retractable or removable relative to the bottom, so as to bring the empty shuttle box, in a first stage, automatically to a tilted position immediately below the tray, also in a tilted position, by subjecting the box to an upward movement during which the back wall of the box is retracted so as to enable the flat articles to be transferred by sliding through the opening in the tray into the box;

automatically moving the full shuttle box for automatically bringing the shuttle box, in a second stage, towards the unloading zone in a downward movement during which the back wall of the box is re-positioned in an operational box closure position on the box;

automatically moving the full shuttle box in an essentially horizontal movement in translation to a waiting zone where the box going past is detected by a crossing sensor, the conveyor being stopped so as to hold the shuttle box in a stationary position in the waiting zone in response to the box going past being detected by said crossing sensor, and the conveyor being started again in response to a control button of the conveyor being actuated so as to move the shuttle box to the unloading zone;

moving a moving paddle mounted on an articulated arm downwards by pivoting of the arm so as to retract the front wall of the box;

moving the paddle horizontally by sliding it along a rail so as to place the paddle substantially vertically above the back wall of the box;

moving the paddle downwards by pivoting of the articulated arm so as to insert it between the back wall of the box and the stack of flat articles;

moving the paddle horizontally by sliding it along the rail so as to push said stack of articles out of the box;

moving the paddle downwards so as to reposition the front wall of the box in an operational box closure position on the empty shuttle box; and automatically moving the empty shuttle box in an essentially horizontal movement in translation in the opposite direction in response to the control button of the conveyor being actuated so as to move the shuttle box towards the pivot member.

The method of the invention can present the following features:

the method comprises the steps consisting, prior to transferring the flat articles by sliding them through the opening of the tray into the shuttle box, in:

bringing the tray into a frame suitable for holding the tray firmly;

moving a moving pusher from a first position outside the tray to a second position inside the tray in which the pusher retains the flat articles at the bottom of the tray;

causing the frame to pivot with the pusher and with the pusher actuator about a horizontal axis so as to tilt the opening in the tray downwards; and moving the moving pusher from said second position inside the tray to said first position outside the tray so as to transfer the flat articles into the shuttle box;

after unloading of the shuttle box in the box unloading zone, the empty shuttle box is moved to a diversion zone in which the empty shuttle box is diverted towards a second conveyor parallel to the first conveyor.

BRIEF DESCRIPTION OF THE DRAWINGS

The invention is described in more detail below with reference to the accompanying drawings which show non-limiting examples, and in which:

FIG. 1 is a diagrammatic perspective view of a mailpiece handling system of the invention;

FIG. 3 is a diagrammatic perspective view of a portion of the tray unloading device of the invention with the tray in an initial position;

FIG. 4 is a diagrammatic perspective view of the tray unloading device of FIG. 2, with the tray unloading device in a second position;

FIG. 5 is a diagrammatic perspective view of the tray unloading device of FIG. 2, with the tray unloading device in a third position;

FIG. 6 is a diagrammatic perspective view of the tray unloading device of FIG. 2, with the tray unloading device in a fourth position;

FIG. 7 is a diagrammatic perspective view of the tray unloading device of FIG. 2, with the pivot member in a fifth position;

FIG. 8 is a diagrammatic perspective view of the tray unloading device of FIG. 2 with the pivot member in a sixth position;

FIG. 9 is a diagrammatic perspective view of a shuttle box for the tray unloading device of the invention, with the shuttle box in an open-front position; and FIG. 10 is a flow chart showing the tray unloading steps of the invention.

DETAILED DESCRIPTION OF THE PREFERRED EMBODIMENTS

FIG. 1 shows a handling system 1 of the invention for handling flat articles, e.g. mailpieces 3, stored in horizontal stacks in trays 2. The handling system includes a feed magazine 4 of a sorting machine and a tray transfer system 5. The tray transfer system 5 is arranged to feed the full trays back from the outlets to the inlet of the machine. In particular, for example, it is arranged to cause full trays 2 to be brought automatically from the sorting outlets (not shown) of the sorting machine to the feed magazine 4 where said trays are unloaded, and to cause empty trays 2 that have been unloaded into the feed magazine 4 of the machine to be brought automatically to the sorting outlets. It can be understood that this tray transfer system also has an inlet for being loaded with full trays coming from outside the machine, which full trays are brought to the feed magazine, and also has an inlet for being loaded with empty trays also coming from outside the machine, which empty trays are brought to the sorting outlets of the machine.

The mailpiece handling system 1 includes a semi-automatic tray unloading device 6 interposed between the tray transfer system 5 and the feed magazine 4 firstly for automatically unloading the trays 2 into shuttle boxes 7 disposed immediately below the trays 2, and secondly for helping the operator to unload the mailpieces 3 from the boxes 7 into the feed magazine 4, and for justifying or aligning the stack of mailpieces 3 going into the feed magazine 4. Thus, unloading the trays 2 into the boxes 7 is not performed by the operator, which is quicker and less arduous for the operator. It can be understood that, in general, there is a single tray unloading device 6 per feed magazine 4. The full shuttle boxes 7 can also be taken away towards the outside, e.g. once the sorting process is finished, rather than being brought to the feed magazine 4.

The tray transfer system 5 of the invention comprises firstly an inlet elevator 8 for taking the full trays 2 brought by a tray management system (not shown) of the sorting machine and for lowering them down to the level of the tray unloading device 6 by means of a conveyor 10 that is mounted to move vertically via a respective linear actuator (not shown), and secondly an outlet elevator 9 for raising the empty trays 2 back up to the level of the tray management system by means of a conveyor 11 that is mounted to move vertically via another respective linear actuator (not shown). The tray unloading device 6 comprises a pivot member 18 for causing a current tray 2 to pivot and for emptying it into a shuttle box 7 and a box conveyor 12 that brings the full shuttle box 7 in a movement essentially in horizontal translation to the magazine, making it possible to achieve a high rate of handling of the mailpieces in the sorting machine.

Figure 2:
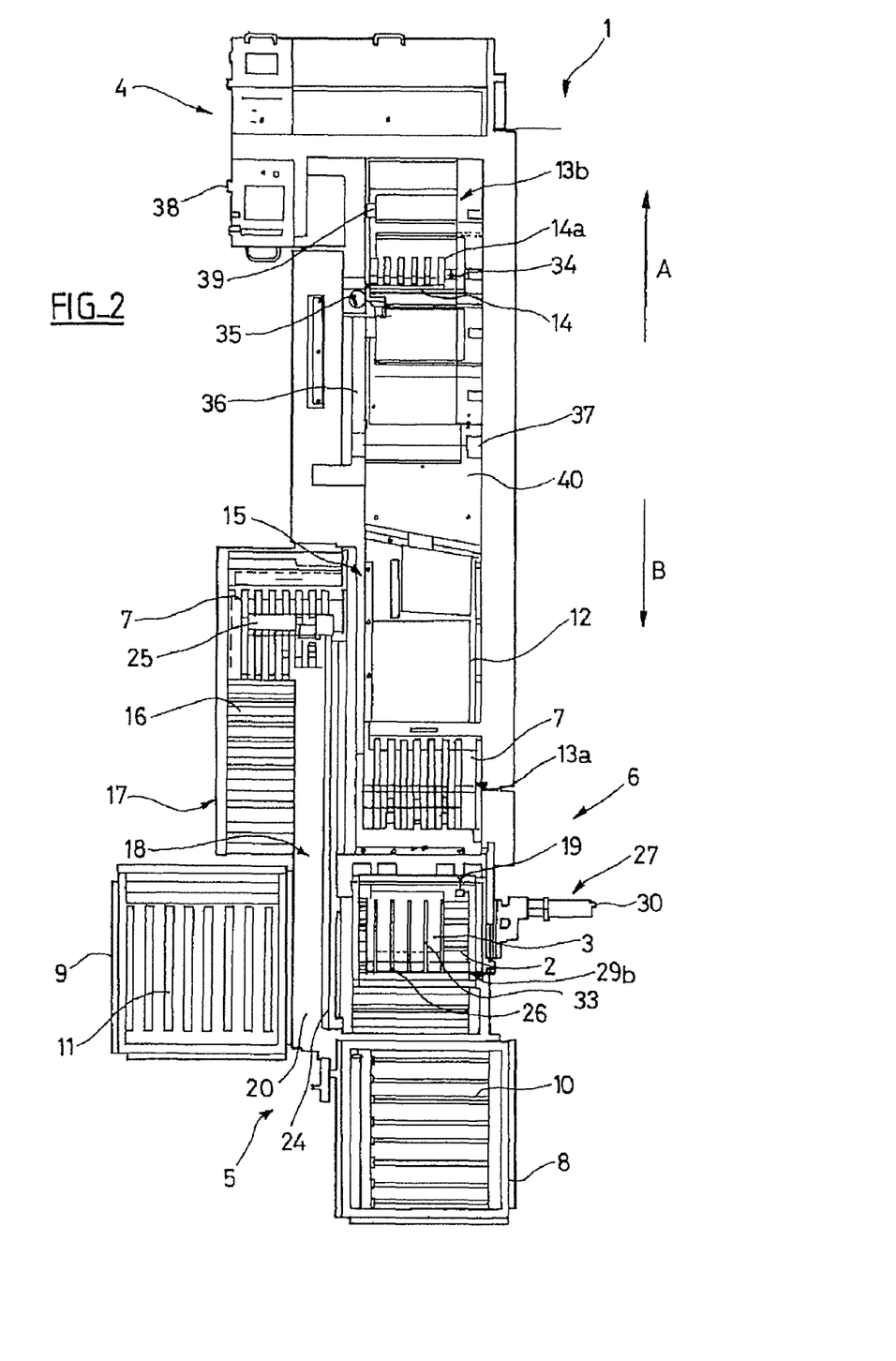
FIG. 2 is a diagrammatic plan view of the mailpiece handling system of the invention.

As can be seen more precisely in FIG. 2, the box conveyor 12 brings at least one full shuttle box 7 from a box loading zone 13a immediately below the tray 2, towards the feed magazine 4 in one direction along a conveying axis, as indicated by arrow A to a box unloading zone 13b where the box 7 is unloaded by the operator by means of a moving paddle 14, the mailpieces 3 then being loaded into the feed magazine 4. The box conveyor is designed also to operate in an opposite direction along the conveying axis towards the tray unloading device 6, as indicated by arrow B in FIG. 2, so as to remove the empty boxes from the box unloading zone 13b towards the tray unloading device 6. A box diverter 15 can be added along the conveyor 12 so as to direct an empty shuttle box 7 towards a second box conveyor 16 serving as a buffer or box accumulation zone 17 in which one or more boxes 7 remain waiting until there is no longer any box present in the tray unloading device 6 immediately below a tray 2.

The trays 2 that are used in this example are standard trays 2a, each of which has an open top so that the mailpieces 3 can be loaded or unloaded, and a bottom 2b and four fixed side walls, as can be seen more clearly in FIG. 8. As can be seen more clearly in FIG. 9, each of the shuttle boxes 7 has an opening 7a at its top, a bottom 7b that is provided with grooves 7h, front and back side walls 7c, 7d that are retractable or removable relative to the bottom 7b to enable the mailpieces 3 to be loaded or unloaded and each of which is provided with groves 7i, 7j, and right and left side walls 7e, 7f that are provided with respective opposite notches 7g, there being four notches on each of the right and left walls in this example, which notches are designed to receive the back wall 7d of the shuttle box 7 so that it is possible to put said back wall into a plurality of different operational closure positions for closing the box, thereby enabling the shuttle box to be adapted to accommodate mailpiece stacks of different thicknesses so as to transport different quantities of mailpieces 3, as described below.

FIG. 3 shows an enlarged view of the tray unloading device 6 that has a pivot member 18 for causing the tray 2 to pivot or tip about a horizontal axis C so as to tilt its opening 2a downwards. The pivot member 18 includes a frame 19 in which the tray 2 is held firmly, the frame being designed to prevent the tray from slipping while it is pivoting, and a frame actuator or articulated arm 20 that is connected to the frame for the purpose of causing the frame 19 containing the tray 2 to pivot. In this example, the articulated arm 20 has an arm segment 21 that is connected via a pivot at a first end 22 to the frame 19, and at a second end 23 to a runner 24 of the articulated arm 20, which runner is mounted to pivot on a shaft 25 that is substantially parallel to the axis C.

As can be seen in FIG. 3, the pivot member 18 further includes a pusher 26 that is mounted to move by means of a pusher actuator 27 so as to hold the mailpieces 3 on the bottom of the tray 2 when the tray 2 is tilted so as to prevent the mailpieces 3 from moving or from slipping relative to one another while the mailpieces 3 are being transferred from the tray 2 to the shuttle box 7, i.e. so to keep a stack of mailpieces properly formed. The pusher actuator 27 includes a runner 28 slidably receiving a slide 29a carrying a bar 29b extending substantially in the same direction as the axis C, and to which the pusher 25 is fastened, the runner 28 being mounted to pivot on a shaft 30 that is parallel to the axis C. Thus, the pusher 26 moves along the runner 28 from a first position outside the tray 2 (shown in FIG. 7) towards a second position inside the tray 2 and in which the pusher 26 retains the mailpieces 3 at the bottom of the tray 2 (shown in FIG. 3).

Unloading mailpieces 3 from a tray 2 to a box 7 is described below with reference to FIGS. 3 to 9.

A full tray 2 is firstly brought by the conveyor 10 of the elevator 8 to another conveyor 10A of the tray unloading device 6 (shown more clearly in FIG. 2) in an initial position inside the frame 19 inside which it is blocked, and the pusher 26, initially in the high position above the tray 2, is lowered to the low position along the slide 28 so as to hold the mailpieces 3 in a horizontal stack on the bottom of the tray 2, as can be seen in FIG. 3. At the same time, an empty shuttle box 7 is brought by the conveyor 12 to immediately below the tray 2 in the tray unloading device 6, whereupon the box 7 is tilted with its back wall 7d up by a box tilting device 31, and the back wall 7d is retracted or removed by an opening device 32 as can be seen in FIG. 4.

The tray 2 is then tilted, i.e. pivoted about the axis C, by a movement of the articulated arm 20 of the pivot member 18, in which movement the arm segment 21 moves along a runner 24 as can be seen in FIG. 5, the mailpieces 3 being retained in the tray 2 by the pusher 26 that simultaneously pivots with the runner 28 about the shaft 30.

Then, the pusher 26 moves along the runner 28 so as to bring the mailpieces 3 into the box 7, as can be seen in FIG. 6. The pusher 26 is advantageously implemented in the form of an L-shaped comb having a plurality of L-shaped teeth 33, each tooth having a first portion 33A fastened to the bar 29b and a second portion 33B extending substantially perpendicularly to the first portion 33A, and the teeth being adapted to be inserted into the grooves 7j in the front wall 7c of the box 7, so that the mailpieces 3 are unloaded against the front wall 7c without changing the order of the mailpieces 3 in the stack. The pusher 26 is then removed from the box 7, without however changing the order of the mailpieces 3 in the stack, as can be seen in FIG. 7, by deploying a telescopic device 29c mounted between the slide 29a and the bar 29b and that moves the pusher 26 away from the slide 28. It can be understood that, since they are placed in a horizontal stack in the tray, the mailpieces 3 are transferred on the second portion 33B of the teeth 33 and find themselves in a stack on edge in the box 7. The back wall 7d of the box 7 is then put back in place by the box opening device 32, in two opposite notches 7g in the left and right side walls as a function of the size of the stack of mailpieces 3 unloaded into the box.

The tray 2 is then brought back to the horizontal on the conveyor 10 into its initial position shown in FIG. 8 and in which the bottom of the tray 2 is substantially horizontal, by pivoting about the axis C caused by a movement of the articulated arm 20 of the pivot member 18 in which movement the arm segment 21 returns along the runner 24. At the same time, the pusher 26 also returns to its initial position by the runner 28 pivoting about the shaft 30 and by the telescopic device 29c retracting. Finally, the box 7 is brought back to the horizontal by the box tilting device 31 so that its bottom wall 7b is substantially horizontal, and so that it is ready to be brought by the conveyor 12 to the feed magazine 4.

At the box unloading zone 13b, the moving paddle 14 can be mounted on an articulated arm 35 that enables the operator to move the paddle 14 vertically, the arm being mounted on a rail 36 so as to enable the paddle 14 to slide horizontally. The paddle 14 can be fastened to the front wall 7c of the shuttle box 7 via a handle 7k so that the front wall 7c of the box 7 is retracted or removed when the operator raises the moving paddle 14 via a handle 34 on the paddle 14, by causing the articulated arm 35 to pivot from a low position at the bottom 7b of the box 7 to a high position above the box 7. The paddle is preferably in the form of a comb having teeth 14a adapted to be inserted into the grooves 7i in the back wall 7d of the box 7 so that the operator can slide the paddle 14 between the mailpieces 3 and the back wall 7d as can be seen in FIG. 8, by the teeth 14a engaging or meshing with the grooves 7i without touching the mailpieces 3. The teeth 14a of the paddle 14 can be implemented in such a manner as also to mesh with the grooves 7h of the bottom wall 7b of the box 7. In this manner, the stack of mailpieces 3 on edge is not unbalanced, or disorganized by the paddle 14 being inserted. The paddle 14 can be moved horizontally into the low position against the bottom 7h of the box 7 so as to push the mailpieces 3 out of the box 7 and so as to load them into the feed magazine 4. In a variant, the articulated arm 35 can be omitted and it is then the operator who raises the paddle 14 directly, then causes it to slide along the rail 36, and finally lowers it into the box 7 in order to unload the mailpieces 3.

For reasons of safety, the automatic tray unloading device 6 can be designed to prevent the operator having access to the device while said device is operating, e.g. by being designed to be covered. A safety device 37 can also be inserted along the conveyor 12 so as to protect the operator while the boxes 7 are being unloaded semi-automatically. For example, the safety device 37 can comprise a crossing sensor for detecting the passing of a shuttle box 7 in the direction A between the pivot member 18 and the box unloading zone 13b, which sensor makes it possible to stop the conveyor 12 so as to hold the full shuttle box 7 stationary in a waiting zone 40 until a signal is received from the operator via a control button 38 that responds to being actuated by operating the conveyor 12 so as to move the full shuttle box 7 from its waiting position to the box unloading zone 13b where the shuttle box 7 is unloaded by the operator. In the same way, the control button 38 actuated by the operator triggers the conveyor 12 so as to cause it to advance in the opposite direction B for the purpose of moving the empty shuttle box 7 from the box unloading zone 13b to the pivot member 18.

FIG. 10 shows the steps for operation of the mailpiece handling system 1.

The full trays 2 containing the mailpieces 3 placed horizontally in respective stacks at the bottoms of the trays 2 are brought by a conveyor (not shown) from the sorting outlets of the sorting machine to the tray transfer system 5. When the pivot member 18 is empty, in step 90, a new full tray 2 is brought by the conveyor 10 into the inlet elevator 8, and then, in step 91, the full tray is lowered by the inlet elevator 8 to the level of the pivot member 18 of the tray unloading device 6. In step 92, the tray is transferred to the conveyor 10A into the frame 19 inside which it is blocked, and the pusher 26 is brought onto the mailpieces 3 so as to block them at the bottom of the tray 2. At step 93, the tray 2 is tilted about the axis C by the pivot member 18 as described above, the pusher 26 undergoing the same movement so as to hold the mailpieces 3 in the tray 2, and then the pusher 26 is shifted so as to transfer the mailpieces from the tray 2 to the shuttle box 7.

In step 94, the empty tray 2 is taken by the conveyor 11 of the outlet elevator, and then raised back up to the level of the tray management system of the sorting machine either so as to be transported by the tray management system in step 95, or else so as to be stored in the sorting machine in step 96.

In step 97, the full shuttle box 7 is transferred by the conveyor 12 in the direction A to the feed magazine 4, so as to be handled semi-automatically by the operator. If a first box 7 is already present in the box unloading zone 13*b*, a signal delivered by a presence sensor 39 for sensing the presence of a box 7 placed in the box unloading zone 13*b* causes the conveyor 12 to stop until the first box has left the box unloading zone 13*b* and is directed by the diverter 15 towards the buffer zone 17. The shuttle box 7 can then continue to advance in the direction A on the conveyor 12 until it reaches the waiting zone 40 where it is stopped automatically by the crossing sensor 37. At step 98, when the operator is ready, said operator actuates the control button 38 so as to cause the shuttle box 7 to advance in the direction A to the box unloading zone 13*b*, and said operator empties the box 7 by means of the paddle 14 as described above. Then, in step 99, the operator justifies the mailpieces 3, i.e. further improves their alignment in the stack so as to make it easier for them to be handled or unstacked by the feed magazine 4 in step 100. In step 101, the operator actuates the control button 38 so as to cause the shuttle box 7 to return in the direction B towards the pivot member 8 in order to be loaded with mailpieces 3 thereat.

Advantageously, a plurality of shuttle boxes 7 can then be used simultaneously in the various zones of the tray unloading device 6 in order to guarantee a high throughput rate for the sorting machine. In which case, a first shuttle box 7 is, for example, loaded in the box loading zone 13*a*, while a second shuttle box 7 is being unloaded in the box unloading zone 13*b*. Once said second shuttle box 7 has been unloaded and while it is returning in the direction B towards the pivot member 18, it is diverted by the diverter 16 into the buffer zone 17 so as to allow the first shuttle box 7 to go past on the conveyor 12 towards the box unloading zone 13*b* while a third shuttle box 7 can be being loaded in the box loading zone 13*a*.

The invention claimed is:

1. A device for unloading an open-top tray filled with flat articles placed in a stack on the bottom of the tray, the device comprising
    a pivot member suitable for taking hold of the tray and for tilting its opening downwards;
    a shuttle box suitable for being moved by a conveyor in both directions along a conveying axis between the pivot member and a box unloading zone remote from the pivot member, the shuttle box having a bottom with opposite back and front side walls along the conveying axis, which walls are retractable or removable relative to the bottom;
    a moving pusher suitable for holding the flat articles at the bottom of the tray when the tray is tilted by the pivot member and for moving the flat articles from the tray to the shuttle box;
    a box tilting device suitable for tilting the shuttle box into a tilted position immediately below the tray, and an opening device suitable for retracting the back wall of the tilted shuttle box and then for repositioning the back wall of the box on the box; and
    a moving paddle mounted on an articulated arm, which paddle is firstly suitable for being moved vertically by pivoting of the articulated arm from a low position at the same level as the bottom of the box to a high position above the box, and secondly suitable for being moved horizontally by sliding along a rail, the paddle being designed in such a manner as to retract the front wall of the box and as to be inserted between the back wall of the box and the stack of flat articles.

2. A device according to claim 1, wherein the bottom and the back and front walls of the box are provided with grooves, and wherein the paddle is in the form of a comb having teeth adapted to be inserted into the grooves of the box.

3. A device according to claim 1, wherein the shuttle box includes opposite left and right side walls and wherein the opposite left and right side walls of the shuttle box are equipped with a plurality of opposite notches designed to receive the back wall of the shuttle box so as to close the shuttle box in a plurality of different operational closure positions so as to adapt it to accommodate mailpiece stacks of different thicknesses.

4. A device according to claim 1, wherein the pusher is in the form of an L-shaped comb having teeth adapted to be inserted into the grooves of the front wall of the shuttle box.

5. A device according to claim 1, further comprising a crossing sensor for detecting the passing of a shuttle box between the pivot member and the box unloading zone, which sensor is suitable for holding the shuttle box in a stationary position in response to said crossing sensor detecting it going past; and
    a control button that, in response to being actuated, causes the conveyor to operate so as to move the shuttle box from said position to the box unloading zone and from the box unloading zone to the pivot member.

6. A device according to claim 1, further comprising a presence sensor for sensing the presence of a box in the box unloading zone, which sensor is suitable for stopping the conveyor if a shuttle box is present in the box unloading zone.

7. A device according to claim 1, wherein the pivot member comprises a frame suitable for holding the tray firmly, a pusher actuator suitable for moving the pusher from a first position outside the tray to a second position inside the tray, in which second position the pusher retains the flat articles at the bottom of the tray, and a frame actuator suitable for causing the frame to pivot with the pusher and with the pusher actuator about a horizontal axis so as to tilt the opening of the tray downwards.

8. A device according to claim 1, wherein a second conveyor is provided in parallel with the first conveyor and a box diverter is provided for diverting the boxes from the first conveyor to the second conveyor.

9. A mailpiece handling system comprising a postal sorting machine having a feed magazine and sorting outlets equipped with removable trays for storing the mailpieces in them, a tray transfer system that is arranged to bring full trays from the sorting outlets of the machine to the feed magazine of the machine and to bring empty trays to the sorting outlets of the machine, and further comprising a tray unloading device according to claim 1, interposed between the tray transfer system and the magazine of the machine.

10. A method of unloading open-top trays filled with flat articles placed in a stack on the bottom of the tray, the method using a pivot member suitable for taking hold of the tray and for tilting its opening downwards, said method comprising the steps of:
    automatically moving an empty shuttle box by means of a conveyor between the pivot member and a box unloading zone remote from the pivot member, the shuttle box having a bottom with opposite back and front side walls that are removable relative to the bottom, so as to bring the empty shuttle box, in a first stage, automatically to a tilted position immediately below the tray, also in a tilted position, by subjecting the box to an upward movement during which the back wall of the box is retracted so as to enable the flat articles to be transferred by sliding through the opening in the tray into the box;

automatically moving the full shuttle box for automatically bringing the shuttle box, in a second stage, towards the unloading zone in a downward movement during which the back wall of the box is re-positioned in an operational box closure position on the box;

automatically moving the full shuttle box in an essentially horizontal movement in translation to a waiting zone where the box going past is detected by a crossing sensor, the conveyor being stopped so as to hold the shuttle box in a stationary position in the waiting zone in response to the box going past being detected by said crossing sensor, and the conveyor being started again in response to a control button of the conveyor being actuated so as to move the shuttle box to the unloading zone;

moving a moving paddle mounted on an articulated arm downwards by pivoting of the arm so as to retract the front wall of the box;

moving the paddle horizontally by sliding it along a rail so as to place the paddle substantially vertically above the back wall of the box;

moving the paddle downwards by pivoting of the articulated arm so as to insert it between the back wall of the box and the stack of flat articles;

moving the paddle horizontally by sliding it along the rail so as to push said stack of articles out of the box;

moving the paddle downwards so as to reposition the front wall of the box in an operational box closure position on the empty shuttle box; and automatically moving the empty shuttle box in an essentially horizontal movement in translation in the opposite direction in response to the control button of the conveyor being actuated so as to move the shuttle box towards the pivot member.

11. A method of unloading trays according to claim 10, comprising the steps of, prior to transferring the flat articles by sliding them through the opening of the tray into the shuttle box:

bringing the tray into a frame suitable for holding the tray firmly;

moving a moving pusher from a first position outside the tray to a second position inside the tray in which the pusher retains the flat articles at the bottom of the tray;

causing the frame to pivot with the pusher and with the pusher actuator about a horizontal axis so as to tilt the opening in the tray downwards; and moving the moving pusher from said second position inside the tray to said first position outside the tray so as to transfer the flat articles into the shuttle box.

12. A method of unloading trays according to claim 10, wherein, after unloading of the shuttle box in the box unloading zone, the empty shuttle box is moved to a diversion zone in which the empty shuttle box is diverted towards a second conveyor parallel to the first conveyor.

* * * * *